United States Patent
Pujari et al.

(10) Patent No.: US 12,439,103 B1
(45) Date of Patent: Oct. 7, 2025

(54) SYSTEM AND METHOD FOR HYBRID VIDEO ENCODING WITH FALLBACK COMPATIBILITY LOGIC

(71) Applicant: Verkada Inc., San Mateo, CA (US)

(72) Inventors: Pushpak Pujari, San Mateo, CA (US); Chris Hiszpanski, Santa Clara, CA (US); Yunchao Gong, Los Altos, CA (US); Alan Anderson, Los Altos, CA (US); Erich J. Kreutzer, Cabin John, MD (US); Jordan Wesley Graham Carlson, Carlsbad, CA (US); William Nicholas Chiu, San Francisco, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/678,258

(22) Filed: May 30, 2024

Related U.S. Application Data (60) Provisional application No. 63/505,335, filed on May 31, 2023.

(51) Int. Cl.
*H04N 21/2343* (2011.01)
*H04N 21/2187* (2011.01)
*H04N 21/239* (2011.01)

(52) U.S. Cl.
CPC . *H04N 21/234309* (2013.01); *H04N 21/2187* (2013.01); *H04N 21/2393* (2013.01)

(58) Field of Classification Search
None
See application file for complete search history.

(56) References Cited

U.S. PATENT DOCUMENTS

| 10,542,266 B2 | 1/2020 | Samy |
| 11,290,680 B1 * | 3/2022 | Bright-Thomas ....... H04L 65/80 |
| 2022/0256240 A1 | 8/2022 | Maejima et al. |

OTHER PUBLICATIONS

Author Unknown, "Codec Tables," Jellyfin: The Free Software Media System, first publication date unknown [online], published at https://jellyfin.org/docs/general/clients/codec-support/ and retrieved via the Internet Archive Wayback Machine on Jun. 7, 2024, 11 pages.

(Continued)

*Primary Examiner* — Omar S Parra
(74) *Attorney, Agent, or Firm* — COOLEY LLP (57) ABSTRACT

A method for hybrid video encoding includes receiving, via a browser, a signal representing a requested media, and determining whether the browser is compatible with high efficiency video encoding (H.265). When the browser is compatible with H.265, the requested media is transmitted, via a first video encoder, in a non-transcoded, H.265 format. When the browser is incompatible with H.265, one of: (1) a H.265 version of the requested media is transcoded to a transcoded H.264 version when the requested media includes recorded video footage, (2) the H.265 version of the requested media is transcoded to the transcoded H.264 version when the requested media does not include recorded video footage and includes full resolution video footage, or (3) the requested media is transmitted via a second video encoder in a non-transcoded, H.264 format when the requested media does not include recorded video footage and does not include full resolution video footage.

20 Claims, 4 Drawing Sheets

(56) References Cited

OTHER PUBLICATIONS

Author Unknown, "Kingsoft Media Cloud Transcoder," Kingsoft Cloud Company, first publication date unknown [online], published at https://en.ksyun.com/nv/product/KMCT.html and retrieved via the Internet Archive Wayback Machine on Jun. 7, 2024, 6 pages.

Author Unknown, "Vivint Cameras 2023 Guide," SafeWise Home Security and Safety Company, first publication date unknown [online], published at https://www.safewise.com/vivint-cameras/ and retrieved via the Internet Archive Wayback Machine on Jun. 7, 2024, 18 pages.

Hwung, "3 Ways to Convert H265 to H264 without Losing Quality," Digiarty Company, published at https://www.videoproc.com/media-converter/convert-h265-to-h264.htm and retrieved via the Internet Archive Wayback Machine on Jun. 7, 2024, 11 pages.

\* cited by examiner

SYSTEM AND METHOD FOR HYBRID VIDEO ENCODING WITH FALLBACK COMPATIBILITY LOGIC

CROSS-REFERENCE TO RELATED APPLICATIONS

This application claims priority to and the benefit of U.S. Provisional Patent Application No. 63/505,335, filed May 31, 2023 and titled "SYSTEM AND METHOD FOR HYBRID VIDEO ENCODING WITH FALLBACK COMPATIBILITY LOGIC," the contents of which are hereby incorporated by reference in their entirety.

FIELD

The present disclosure generally relates to video encoding, and more specifically, to systems and methods for facilitating viewing of encoded video via compute devices/web browsers that are not compatible with an original encoding of the encoded video.

BACKGROUND

Video surveillance systems often include multiple video cameras and generate large volumes of video data. A video codec is the hardware and/or software used to compress video data into a digital format or file. Playback devices, in turn, use video codecs to decompress video files so that the video can be viewed. Most encoded video content is bundled with an encoded audio stream and bundled in a container file.

SUMMARY

In some embodiments, an apparatus includes a processor and a memory operably coupled to the processor. The memory stores instructions to cause the processor to receive, from a compute device including a viewer, a signal representing a request specifying a requested media. The memory also stores instructions to cause the processor to determine whether the viewer is configured to support high efficiency video encoding. The memory also stores instructions to cause the processor to, in response to the viewer being determined to support high efficiency video encoding, cause transmission of the requested media in a non-transcoded, H.265 format. The memory also stores instructions to cause the processor to, in response to the viewer being determined not to support high efficiency video encoding, determine whether the requested media includes recorded video footage. In response to the requested media being determined to include recorded video footage, a H.265 version of the requested media is transcoded, to produce a transcoded H.264 version of the requested media, and the requested media is caused to be transmitted in the transcoded H.264 format. In response to the requested media being determined not to include recorded video footage, a determination is made as to whether the requested media includes full resolution video footage. In response to the requested media being determined to include full resolution video footage, the H.265 version of the requested media is transcoded to the H.264 version of the requested media, and the requested media is caused to be transmitted in the transcoded H.264 format. In response to the requested media being determined not to include full resolution video footage, the requested media is caused to be transmitted in a non-transcoded, H.264 format.

In some embodiments, a non-transitory, processor-readable medium stores instructions to cause a processor to perform a method including receiving, from a compute device, a signal representing a request specifying a requested media, and determining whether a browser of the compute device is configured to support high efficiency video encoding. In response to the browser being determined to support high efficiency video encoding, the requested media is caused to be transmitted in a non-transcoded, H.265 format, and in response to the browser being determined not to support high efficiency video encoding, a determination is made as to whether the requested media includes recorded video footage. In response to the requested media being determined to include recorded video footage, a H.265 version of the requested media is transcoded to a transcoded H.264 version of the requested media, and the requested media is caused to be transmitted in the transcoded H.264 format. In response to the requested media being determined not to include recorded video footage, a determination is made as to whether the requested media includes full resolution video footage. In response to the requested media being determined to include full resolution video footage, the H.265 version of the requested media is transcoded to the transcoded H.264 version of the requested media, and the requested media is caused to be transmitted in the transcoded H.264 format. In response to the requested media being determined not to include full resolution video footage, the requested media is caused to be transmitted in a non-transcoded, H.264 format.

In some embodiments, a system includes a processor, a set of video encoders operably coupled to the processor, and a memory operably coupled to the processor. The memory stores instructions to cause the processor to receive, from a compute device and via a browser, a signal representing a requested media. The memory also stores instructions to cause the processor to determine whether the browser is compatible with high efficiency video encoding (H.265). The memory also stores instructions to cause the processor to, in response to the browser being determined to be compatible with high efficiency video encoding, cause transmission, via a first video encoder from the set of video encoders, of the requested media in a non-transcoded, H.265 format, and in response to the browser being determined not to be compatible with high efficiency video encoding, one of: (1) transcode a H.265 version of the requested media to a transcoded H.264 version of the requested media when the requested media includes recorded video footage, or (2) transcode the H.265 version of the requested media to the transcoded H.264 version of the requested media when the requested media does not include recorded video footage and the requested media includes full resolution video footage, or (3) cause transmission, via a second video encoder from the set of video encoders, of the requested media in a non-transcoded, H.264 format when the requested media does not include recorded video footage and the requested media does not include full resolution video footage, the second video encoder different from the first video encoder.

DETAILED DESCRIPTION

Some embodiments set forth herein include a video encoder configuration and fallback logic collectively configured to play H.265 encoded video on devices/in web browsers of users having a compute device and/or a web browser that is incompatible with H.265 encoded video playback.

Today, the landscape of H.265 video playability in web application in a web browser is fragmented and typically requires the right combination of: (1) a supported web browser, (2) a supported web browser version, and (3) supported central processing unit (CPU)/graphics processing unit (GPU) hardware in the device on which playback is to occur. Since hundreds of combinations of unsupported web browser, web browser version, and hardware exist, some known vendors issue minimum system requirements for video playback to work/function properly. The issuance of such system requirements, however, can lead to a bad customer experience, for example since if a user having a compatible web browser/hardware configuration changes web browsers (to an incompatible web browser) or uses an incompatible different compute device, they would then be unable to play H.265 video. According to one or more embodiments set forth herein, a novel video encoder configuration and fallback logic are presented that make it possible for all users to play security camera video originally encoded in an H.265 format, via any web application/web browser and on any hardware device, using any operating system. Video encoder configurations and fallback logic set forth herein are, to the inventors' knowledge, the first of their kind, including when implemented in the context of a hybrid, cloud-based security video system.

H.265 (also referred to as High Efficiency Video Coding (HEVC) or "MPEG-H Part 2") is a video compression standard that was developed as a successor to the widely used H.264 (also referred to as Advanced Video Coding (AVC)), and that can achieve better compression at the same quality, or improved video quality, at the same bit rate, relative to H.264. H.264 and H.265 differ from one another in how they process information/data, and in the resulting video file size and bandwidth consumption used with each standard. H.264 processes frames of video using macroblocks, while H.265 processes information using coding tree units (CTUs). CTUs can process information/data more efficiently, which can result in smaller file sizes and less bandwidth and/or compute resources (e.g., memory resources, bus resources, processing resources, etc.) used for a given streamed video. H.265 video compression standard achieves higher compression efficiency compared to H.264, which means it can significantly improve video quality while using less bandwidth, making it ideal for security camera applications such as Verkada Command. H.265 was launched in 2015, however its adoption in the industry has been slow due to intellectual property related issues. As discussed above, prior to this disclosure playback of H.265 encoded video in a web application running in a web browser (such as Verkada Command) has required the use of a compatible hardware (e.g., personal computer (PC or Mac), mobile device, etc.) and a compatible web browser with a compatible web browser version. Until recently, most web browsers did not support H.265 video playback. Chrome® recently announced that its version 107 (and subsequent versions) would allow H.265 video to be played if the underlying hardware supports H.265 decoding. Microsoft® Edge also supports H.265 video playback, but typically requires a plugin to be purchased and downloaded from the Microsoft® software application ("app) store. Firefox® does not support H.265, with no plans to support it in the near future.

Example Video Encoder Configuration

One or more embodiments set forth herein include a video encoder configuration that includes three video encoders (also referred to herein as encoders), for example as follows:

Encoder 1: H.265 (high definition (HD) historical/archived video; HD live video)

Encoder 2: H.265 (standard definition (SD) historical/archived video; SD live video)

Encoder 3: H.264 (SD live video)

Encoder 3 can be configured to serve video to one or more client compute devices (having associated users or "viewers") on a local communications network that pull/request camera footage directly from the camera. Since encoder 3 is configured to stream/deliver SD live video, the above encoder configuration ensures that live video can played on the local communications network on the one or more client compute devices, irrespective of whether the one or more client compute devices include compatible hardware, web browser(s), web browser version(s), or combinations thereof.

Although described above as including three video encoders, other video encoder configuration embodiments can include two, four, five, between 3 and 5, or any other suitable number of video encoders, with varying configurations that collectively facilitate the servicing/delivery of playable video to multiple user/viewer compute devices having diverse web browsers, hardware, etc.

Example Fallback Logic

For remote viewers whose associated compute devices include hardware, web browser(s), web browser version(s), or combinations thereof that are not compatible with H.265 encoding (such compute devices being referred to herein as running "unsupported" hardware and/or software), in one or more embodiments, requested video segments are converted, via a cloud transcoding step, into H.264 format "on-the-fly," with minimal latency and with minimal computational overhead/resources consumed. Similarly stated, data that represents the requested video segments undergoes a transformation to result in modified and/or new data that represents the requested video segments. In some instances, since H.264 is supported in all browsers, the fallback logic as described herein facilitates the playback of video originally encoded in H.265 in any machine (compute device)/browser combination.

The video encoder configuration and fallback logic set forth herein, examples of which are provided above, according to some embodiments, can facilitate the playback of video, whether encoded in H. 264 or H.265, and regardless of compute device/web browser compatibility, in a hybrid cloud-based security system. Without the use of a video encoder configuration and/or fallback logic as described herein, H.265 either could not be supported on cameras of a hybrid cloud-based video security system, or would involve a complex list of minimum system requirements that would be difficult for most security camera customers/viewers to accommodate. Moreover, encoder configurations with fallback logic described herein, according to one or more embodiments, make state-of-the-art video camera streaming technology available to all users/viewers without costly hardware upgrades being performed, and without degradation of the video streaming or playback experience for users whose compute devices/web browsers do not support H.265.

Figure 1:
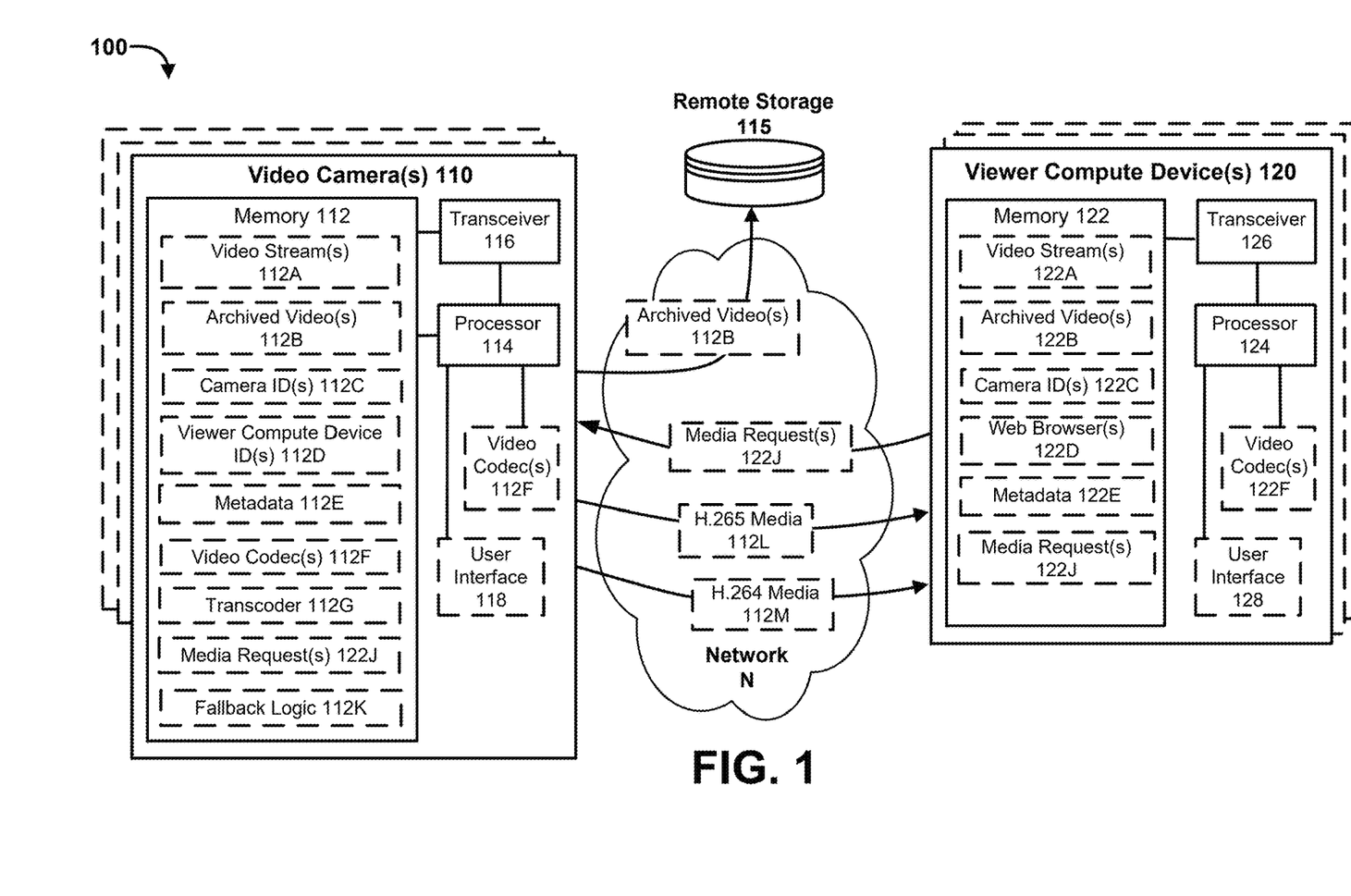
FIG. 1 is a diagram of a system for hybrid video encoding, according to some embodiments.

FIG. 1 is a diagram of a system for hybrid video encoding, according to some embodiments. As shown in FIG. 1, the system 100 (e.g., a multi-camera security system) includes at least one video camera 110, in operable communication via a wireless and/or wired telecommunications network "N" with one or more viewer compute devices 120 and/or one or more remote storage devices (e.g., cloud storage, database(s), etc.) 115. Each video camera 110 includes a memory 112 operably coupled to a transceiver 116, a processor 114, optionally one or more hardware-implemented video codecs (video coders/decoders) 112F, and optionally a user interface 118 (e.g., a graphical user interface (GUI), a display panel, etc.). The processor 114 is operably coupled to the transceiver 116 and, if present, the codec(s) 112F and/or the user interface 118. The memory 112 stores one or more of: data associated with one or more video streams 112A, data associated with historical/archived video(s) 112B, one or more camera identifiers (IDs) 112C, one or more viewer compute device IDs 112D, metadata 112E, one or more software-implemented video codecs 112F, a transcoder 112G configured to transcode video having a first video encoding into video having a second video encoding different from the first video encoding, one or more media requests 122J, and/or fallback logic 112K. The metadata 212E can include for example data specifying items related to characteristics of the video data, such as (but not limited to) aperture, shutter speed, International Organization for Standardization (ISO) number, focal depth, dots per inch (DPI), etc. The metadata 212E can include for example descriptive metadata, structural metadata, preservation metadata, provenance metadata, and/or administrative metadata.

The processor 114 can be or include, for example, a hardware based integrated circuit (IC), or any other suitable processing device configured to run and/or execute a set of instructions or code. For example, the processor 114 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 114 can be configured to run any of the methods and/or portions of methods discussed herein.

The memory 112 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 114 to perform one or more processes, functions, and/or the like. In some implementations, the memory 112 can include extendable storage units that can be added and used incrementally. In some implementations, the memory 112 can be a portable memory (e.g., a flash drive, a portable hard disk, and/or the like) that can be operatively coupled to the processor a14. In some instances, the memory 112 can be remotely operatively coupled with a compute device (not shown); for example, a remote database device can serve as a memory and be operatively coupled to the compute device. The memory 112 can include various components (e.g., machine-readable media) including, but not limited to, a random-access memory component, a read only component, and any combinations thereof. In some cases, a basic input/output system (BIOS), including basic routines that help to transfer information between components within the compute device 120, such as during start-up, can be stored in memory 112. The memory 112 can further include any number of program modules including, for example, an operating system, one or more application programs, other program modules, program data, and any combinations thereof.

In some implementations, the telecommunications network N can include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the telecommunications network N can be a wireless network such as, for example, a Wi-Fi or wireless local area network ("WLAN"), a wireless wide area network ("WWAN"), and/or a cellular network. In some instances, the telecommunications network N can be a wired network such as, for example, an Ethernet network, a digital subscription line ("DSL") network, a broadband network, and/or a fiber-optic network. In some instances, the compute device 101 and can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the telecommunications network N can be encrypted or unencrypted. In some instances, the telecommunications network N can include multiple networks or subnetworks operatively coupled to one another by, for example, network bridges, routers, switches, gateways and/or the like.

Each of the viewer compute device(s) 120 includes a memory 122 operably coupled to a transceiver 126, a processor 124, optionally one or more hardware-implemented video codecs 122F, and optionally a user interface 128 (e.g., a graphical user interface (GUI), a display panel, etc.). The processor 124 is operably coupled to the transceiver 126 and, if present, the video codec(s) 122F and/or the user interface 128. The memory 122 stores one or more of: data associated with one or more video streams 122A, data associated with historical/archived video(s) 122B, one or more camera identifiers (IDs) 122C, one or more web browsers 122D (each having an associated current web browser version), metadata 122E, and/or one or more media requests 122J.

As shown in FIG. 1, during operation of the system 100, a viewer associated with a viewer compute device 120 may enter a request for video media (a media request 122J), e.g., via the user interface 128, and the processor 124 of the viewer compute device 120 of that viewer can cause transmission of a signal representing the media request 122J to one or multiple video cameras 110. In response to the media request(s), the video camera(s) 110 can implement a procedure such as method 200 of FIG. 2 (discussed below), to identify and/or generate the appropriate video encoding/media to satisfy the viewer request. Consequently, the processor 114 of the video camera(s) 110 can cause transmission of a signal representing one of H.265 video media 112L or H.264 video media 112M back to the viewer compute device 120 for display (e.g., via user interface 128) to the viewer.

Figure 2:
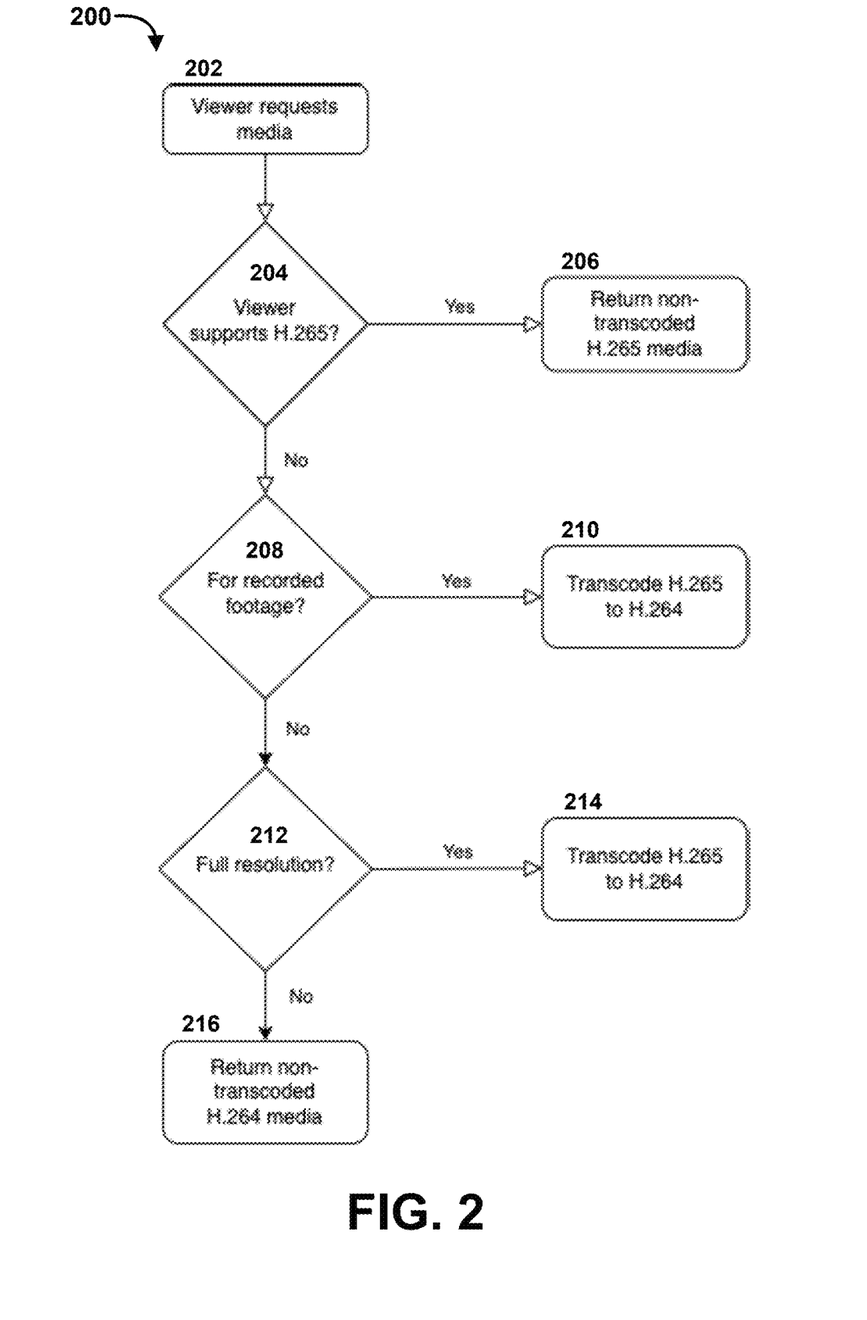
FIG. 2 is a flow diagram showing a first method for performing hybrid video encoding and implementing fallback logic, according to some embodiments.

FIG. 2 is a flow diagram showing a first method for performing hybrid video encoding and implementing fallback logic, according to some embodiments. As shown in FIG. 2, the method 200 includes, at 202, an event in which a user/viewer requests media (i.e., via a request) via a compute device associated with that viewer. The request can specify one or more of: a camera identifier, a video identifier, a video encoding, a video description, a date/time of a requested video, a representation of whether recorded or live footage is desired, a requester identifier, a representation of a hardware of the compute device of the viewer, a representation of a web browser of the compute device of the viewer, a representation of a web browser version of the compute device of the viewer, etc., and may be received via a processor of a networked video camera. At 204, a determination is made by the processor of the video camera (e.g., based on the request) as to whether the compute device of the viewer supports H.265 video playback. If so, a non-transcoded H.265 version of the requested media is returned, by the processor of the video camera, to the compute device of the viewer, at 206. If the determination at 204 is that the compute device of the viewer does not support H.265 video playback, a determination is made by the processor of the video camera (e.g., based on the request), at 208, as to whether the request is for recorded footage. If so, the processor of the video camera transcodes an H.265 version of the requested media into an H. 264 version of the requested media at 210. The transcoded media can then be returned, by the processor of the video camera, to the compute device of the viewer (not shown). If the determination at 208 is that the request is not for recorded footage, a determination is made by the processor of the video camera (e.g., based on the request), at 212, as to whether the request is for full resolution video. If so, the processor of the video camera transcodes an H.265 version of the requested media into an H. 264 version of the requested media at 214. If the determination at 212 is that the request is not for full resolution video, a non-transcoded H.264 version of the requested media is returned, by the processor of the video camera, to the compute device of the viewer, at 216.

Examples of Selected Encoder Parameters

Consider that there are three video encoders for a given system-on-chip (SoC) (e.g., a SoC manufactured by Ambarella or HiSilicon), and that the video encoders are configured as follows:

Encoder A:
  Full image sensor resolution
  H.265
  4 second group-of-pictures size (i.e., interval between inline frames ("iframes"))
  For live streaming and recording-to-storage
Encoder B:
  Down-sampled resolution
  H.265
  4 second group-of-pictures size
  For live streaming and recording-to-storage
Encoder C:
  Down-sampled resolution
  H.264
  1 second group-of-pictures size
  For live streaming only In one or more embodiments, to simultaneously use encoders A and B for live streaming and recording-to-storage, a large (e.g., about 4 seconds) group-of-pictures size may be used. Live video content can be played back from the instantaneous decoder refresh (IDR) frame at 1.1× real-time speed, for example until the real-time edge is reached. This achieves the low-latency desired for live streaming, while also achieving efficient compression desired for recording-to-storage given tight storage constraints (typically tighter than network bandwidth constraints).

In one or more embodiments, users/viewers may use any web browser, operating system, or compute device, to view video that was originally encoded in any of a variety of formats/encodings, and regardless of the compatibility of their web browser, operating system, or compute device with that original encoding, in either a transcoded or non-transcoded format.

Support for/compatibility with H.265 encoded video can vary across combinations of web browsers and their versions, operating systems and their versions, installed extensions, and devices. For example:

For Google Chrome® 104 or newer, H.265 is supported where hardware decoding support is available (e.g., for Intel CPUs produced after January 2017)
  For Google Chrome® 103 or older, H.265 is not supported
  For Firefox®, H.265 is not supported
  For Safari®, H.265 is supported
  For Microsoft Edge®, H.265 is supported where hardware decoding support is available, or when HEVC extensions have been installed As a further example, on some mobile devices, H.265 support is limited to particular video dimensions (e.g., up to 2160p) that may be exceeded by fisheye cameras, for example.

Integrated system-on-chip (SoC) vendors within the video security market (such as Ambarella and HiSilicon) offer SoCs that are limited to three video encoders, of which one can be a full-resolution encoder. In some instances, it may not be possible to encode both H.264 and H.265 concurrently at the full image sensor resolution.

One or more embodiments of the present disclosure facilitate the delivery of viewable video to multiple concurrent viewers, some of which have compute devices, web browsers and/or web browser versions that support H.265, and others of which do not have compute devices, web browsers and/or web browser versions that support H.265, who for example may desire to view a live video stream concurrently with one another.

One or more embodiments of the present disclosure may include encoder configurations that accommodate one or more of the following constraints:

Depending on the amount of on-board storage for a given camera, one or both of H.264 and H.265 video may be recorded by that camera. Alternatively or in addition, one or both low-resolution and high-resolution of a single codec may be recorded by that camera. In some implementations, only low-resolution H.265 footage may be recorded for a given, without recording high-resolution H. 265 footage. Selecting encoder and/or camera configurations for selective distribution of the video storage, video retrieval and/or video transcoding functions, optionally taking into account the associated video resolution(s), may be desirable.

Depending on the amount of available bandwidth for a given set of networked cameras, uploading video from all cameras concurrently may be disabled or restricted/limited.

Depending on the types of requests made by users/viewers (i.e., the "access patterns" associated with requests for video), many more hours of live video may be streamed than recorded video. Alternatively or in addition, many more hours of low-resolution video footage may be streamed than high-resolution video footage. Since cloud-based transcoding of video can be cost prohibitive, selecting an encoder configuration that minimizes the amount of video to be transcoded may be desirable.

In one or more embodiments, a camera includes a plurality of encoders, only one of which may be used for high resolution, and the plurality of encoders is configured to perform multiple different functions, including live streaming, storage (e.g., lower bandwidth), H264 video servicing, and/or H265 video servicing.

In some embodiments, a hybrid video encoding system includes multiple encoders and fallback logic. Each encoder from the multiple encoders can have a plurality of associated encoder parameters (e.g., including codec, resolution, and group-of-pictures size) that can be selectively set to optimize the system's ability to deliver video that is playable/compatible with the compute device of a requester/user. An example set of encoder parameters is as follows:

```
$ test_encode --show-all-info
...
    H.265
                        profile = Main
                            M = 1
                            N = 96
            N update mode = 0
                   idr interval = 1
                       gop model = simple
                 chrome format = YUV420
                    mv threshold = 0
         extra_bias_qp_th = 0
           fast_seek_intvl = 0
          dblk_cstm_enable = 1
 dblk_filter_enable = 1
                     dblk_alpha = -3
                      dblk_beta = -1
            long_start_code = 1
                       au_type = 3
                    vbr_setting = 5
       average_bitrate = 1500000
                   svbr_ness = 100
            svbr_average = 1500000
          svbr min~max = 600000~1500000
                      adapt_qp = 2
                 i_qp_reduce = 6
                 p_qp_reduce = 3
                 q_qp_reduce = 6
                 b_qp_reduce = 0
                 c_qp_reduce = 0
                qp_max_on_I = 41
                qp_min_on_I = 14
                qp_max_on_B = 51
                qp_min_on_B = 21
                qp_max_on_C = 0
                qp_min_on_C = 0
                qp_max_on_D = 0
                qp_min_on_D = 0
                qp_max_on_P = 51
                qp_min_on_P = 17
                qp_max_on_Q = 51
                qp_min_on_Q = 15
  log_q_num_minus_1 = 0
                      skip_flag = 0
              skip_flag_mode = 0
               max_i_size_KB = Disable
            CBR stable mode = 0
                   abs_br_flag = Disable
                      slice num = 0
         slices per info = 0
                    pskip type = Force Pskip
            repeat pskip num = 0
              frame drop type = drop one-time
                frame drop num = 0
                      sar_width = 1
                      sar_height = 1
          custom_sei_enable = 0
             custom_sei_size = 0
   custom_sei_force_idr = 0
       md_cat_lut = 0, 1, 0, 0, 0, 0, 0, 0
                      ltrs_type = 1
               log2_num_ltrp_per_gop = 0
                  two_ltrs_mode = 0
                       aqp_type = 2
Stream Dummy Latency = 0
...
```

The fallback logic can be configured to implement a cloud transcoding step that converts video segments requested by a remote user/viewer (using a compute device and/or browser that is incompatible with the H.265 video compression standard) into H.264 format on the fly with minimal latency overhead, such that the video originally encoded in H.265 can play in any compute device/browser combination.

In some embodiments, when a camera lacks sufficient storage to store video at a full sensor resolution for a desired duration (e.g., 30 days), two video resolutions may be used—a 'low' resolution and a 'high' resolution. In some implementations, two encoders are used for the low resolution—one encoder for the H.264 codec, and one encoder for the H.265 codec. Note that, in some cases, an encoder cannot concurrently record in multiple resolutions and/or cannot concurrently record in multiple codecs. With regard to the choice of codec and group-of-pictures size, in some implementations, any of a variety of H.264/H.265 profiles, levels, and numbers of P frames between IDR frames may be selected, and two encoders may be configured to output H.265, while one encoder outputs H.264. Alternatively or in addition, two encoders may use a relatively large group-of-pictures (e.g., 4 seconds) while one encoder uses a relatively small group-of-pictures (e.g., 1 second).

Figure 3:
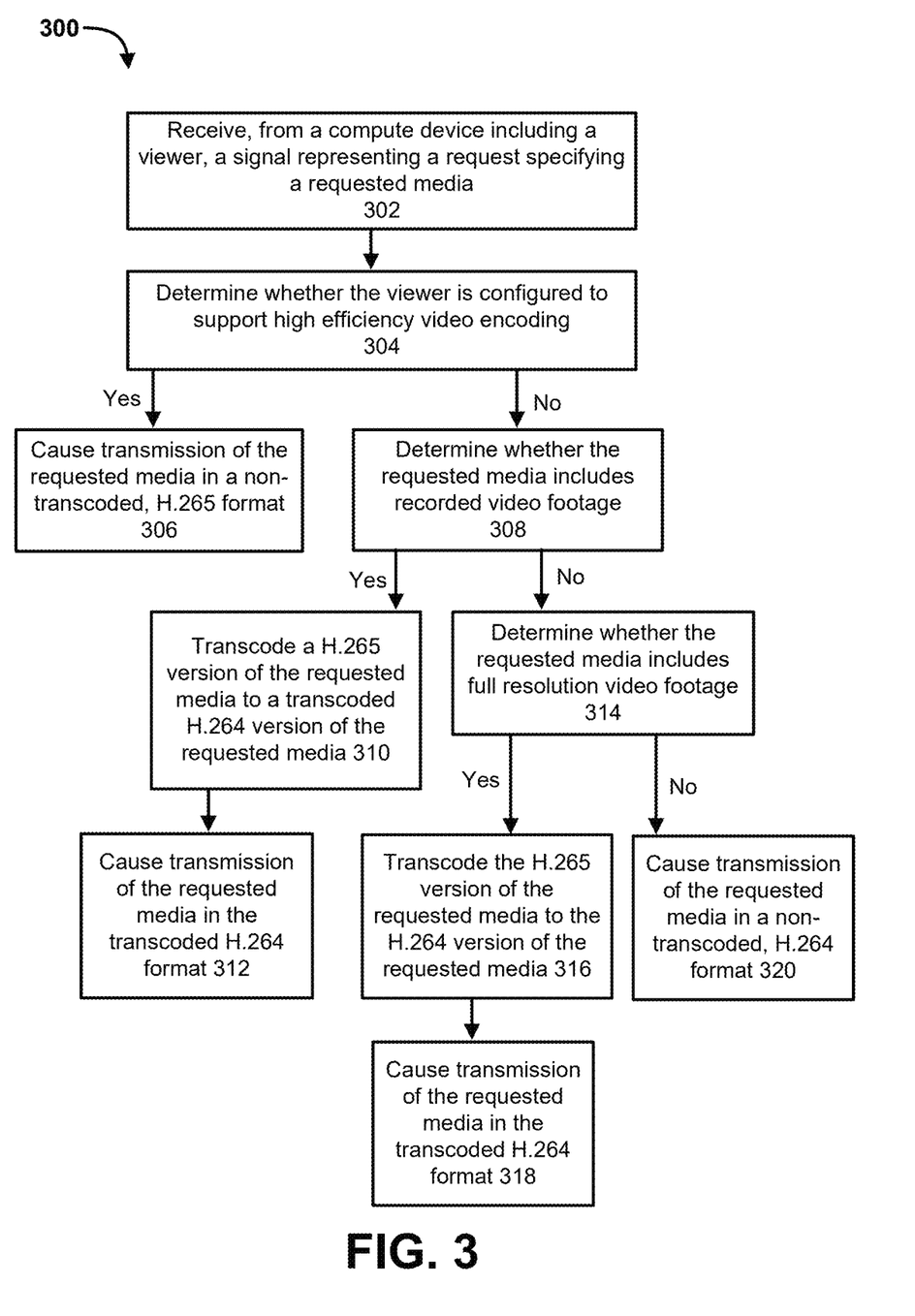
FIG. 3 is a flow diagram showing a second method for performing hybrid video encoding and implementing fallback logic, according to some embodiments.

FIG. 3 is a flow diagram showing a second method for performing hybrid video encoding and implementing fallback logic, according to some embodiments. The method 300 of FIG. 3 can be implemented, for example, using a system such as system 100 of FIG. 1. The method 300 includes receiving, at 302 and from a compute device including a viewer, a signal representing a request specifying a requested media. The method 300 also includes causing the processor, at 304, to determine whether the viewer is configured to support high efficiency video encoding. At 306, in response to the viewer being determined at 340 to support high efficiency video encoding, the method 300 includes causing transmission of the requested media in a non-transcoded, H.265 format. At 308, in response to the viewer being determined not to support high efficiency video encoding, the method 300 includes causing the processor to determine, at 308, whether the requested media includes recorded video footage. In response to the requested media being determined to include recorded video footage, a H.265 version of the requested media is transcoded at 310, to produce a transcoded H.264 version of the requested media, and the requested media is caused to be transmitted in the transcoded H.264 format (at 312). In response to the requested media being determined not to include recorded video footage, a determination is made, at 314, as to whether the requested media includes full resolution video footage. In response to the requested media being determined at 314 to include full resolution video footage, the H.265 version of the requested media is transcoded, at 316, to the H.264 version of the requested media, and the requested media is caused to be transmitted in the transcoded H.264 format (at 318). In response to the requested media being determined not to include full resolution video footage, the requested media is caused to be transmitted, at 320, in a non-transcoded, H.264 format.

In some implementations, the apparatus also includes a plurality of encoders operably coupled to the processor. In some such implementations, the instructions to cause transmission of the requested media in the non-transcoded, H.265 format include instructions to cause transmission of the requested media via a first encoder from the plurality of encoders. Alternatively or in addition, the instructions to cause transmission of the requested media in the non-transcoded, H.264 format can include instructions to cause transmission of the requested media via a second encoder from the plurality of encoders, the second encoder different from the first encoder.

In some implementations, the apparatus also includes a plurality of encoders, operably coupled to the processor, that includes: a first encoder configured for (1) high resolution encoding, (2) a group-of-pictures (GOP) size of about 4 seconds, (3) live streaming, and (4) recording-to-storage, a second encoder configured for (1) down-sampled resolution encoding, (2) a group-of-pictures (GOP) size of about 4 seconds, (3) live streaming, and (4) recording-to-storage, the second encoder different from the first encoder, and a third encoder configured for (1) down-sampled encoding, (2) a group-of-pictures (GOP) size of about 1 second, and (3) live streaming, the third encoder different from the first encoder and the second encoder, the third encode not configured for recording-to-storage.

In some implementations, at least one of the first encoder or the second encoder is configured to perform live streaming at 1.1× real-time relative to an instantaneous decoder refresh (IDR) frame.

In some implementations, the apparatus also includes a plurality of encoders, operably coupled to the processor, that includes: a first encoder configured to output H.264-encoded video, a second encoder configured to output H.265-encoded video, and a third encoder configured to output H.265-encoded video.

In some implementations, the apparatus also includes a plurality of encoders, operably coupled to the processor, that includes: a first encoder from the plurality of encoders having an associated group-of-pictures (GOP) size of about 1 second, a second encoder from the plurality of encoders having an associated group-of-pictures (GOP) size of about 4 seconds, and a third encoder from the plurality of encoders having an associated group-of-pictures (GOP) size of about 4 seconds.

In some implementations, the apparatus also includes a plurality of encoders, operably coupled to the processor, that includes a first encoder from the plurality of encoders having an associated group-of-pictures (GOP) size of about 4 seconds, and configured to perform both live streaming and recording-to-storage, a second encoder from the plurality of encoders having an associated group-of-pictures (GOP) size of about 4 seconds, and configured to perform both live streaming and recording-to-storage, and a third encoder from the plurality of encoders having an associated group-of-pictures (GOP) size of about 1 second and configured to perform live streaming but is not configured to record-to-storage.

In some embodiments, anon-transitory, processor-readable medium stores instructions to cause a processor to perform a method including receiving, from a compute device, a signal representing a request specifying a requested media, and determining whether a browser of the compute device is configured to support high efficiency video encoding. In response to the browser being determined to support high efficiency video encoding, the requested media is caused to be transmitted in a non-transcoded, H.265 format, and in response to the browser being determined not to support high efficiency video encoding, a determination is made as to whether the requested media includes recorded video footage. In response to the requested media being determined to include recorded video footage, a H.265 version of the requested media is transcoded to a transcoded H.264 version of the requested media, and the requested media is caused to be transmitted in the transcoded H.264 format. In response to the requested media being determined not to include recorded video footage, a determination is made as to whether the requested media includes full resolution video footage. In response to the requested media being determined to include full resolution video footage, the H.265 version of the requested media is transcoded to the transcoded H.264 version of the requested media, and the requested media is caused to be transmitted in the transcoded H.264 format. In response to the requested media being determined not to include full resolution video footage, the requested media is caused to be transmitted in a non-transcoded, H.264 format.

In some implementations, the instructions to cause transmission of the requested media in the non-transcoded, H.265 format include instructions to cause transmission of the requested media via a first encoder from a plurality of encoders. Alternatively or in addition, the instructions to cause transmission of the requested media in the non-transcoded, H.264 format include instructions to cause transmission of the requested media via a second encoder from the plurality of encoders, the second encoder different from the first encoder.

In some implementations, the first encoder is configured for (1) high resolution encoding, (2) a group-of-pictures (GOP) size of about 4 seconds, (3) live streaming, and (4) recording-to-storage. Alternatively or in addition, the second encoder is configured for (1) down-sampled resolution encoding, (2) a group-of-pictures (GOP) size of about 4 seconds, (3) live streaming, and (4) recording-to-storage, the second encoder different from the first encoder.

In some implementations, the first encoder has an associated group-of-pictures (GOP) size of about 4 seconds, and is configured to perform both live streaming and recording-to-storage. Alternatively or in addition, the second encoder has an associated group-of-pictures (GOP) size of about 4 seconds, and is configured to perform both live streaming and recording-to-storage. Alternatively or in addition, a third encoder from the plurality of encoders has an associated group-of-pictures (GOP) size of about 1 second and is configured to perform live streaming but is not configured to record-to-storage.

In some implementations, the first encoder has an associated group-of-pictures (GOP) size of about 1 second, the second encoder has an associated group-of-pictures (GOP) size of about 4 seconds, and a third encoder from the plurality of encoders has an associated group-of-pictures (GOP) size of about 4 seconds.

In some implementations, the first encoder is configured to output H.264-encoded video, the second encoder is configured to output H.265-encoded video, and a third encoder from the plurality of encoders is configured to output H.265-encoded video.

In some implementations, at least one of the first encoder or the second encoder is configured to perform live streaming at 1.1× real-time relative to an instantaneous decoder refresh (IDR) frame.

Figure 4:
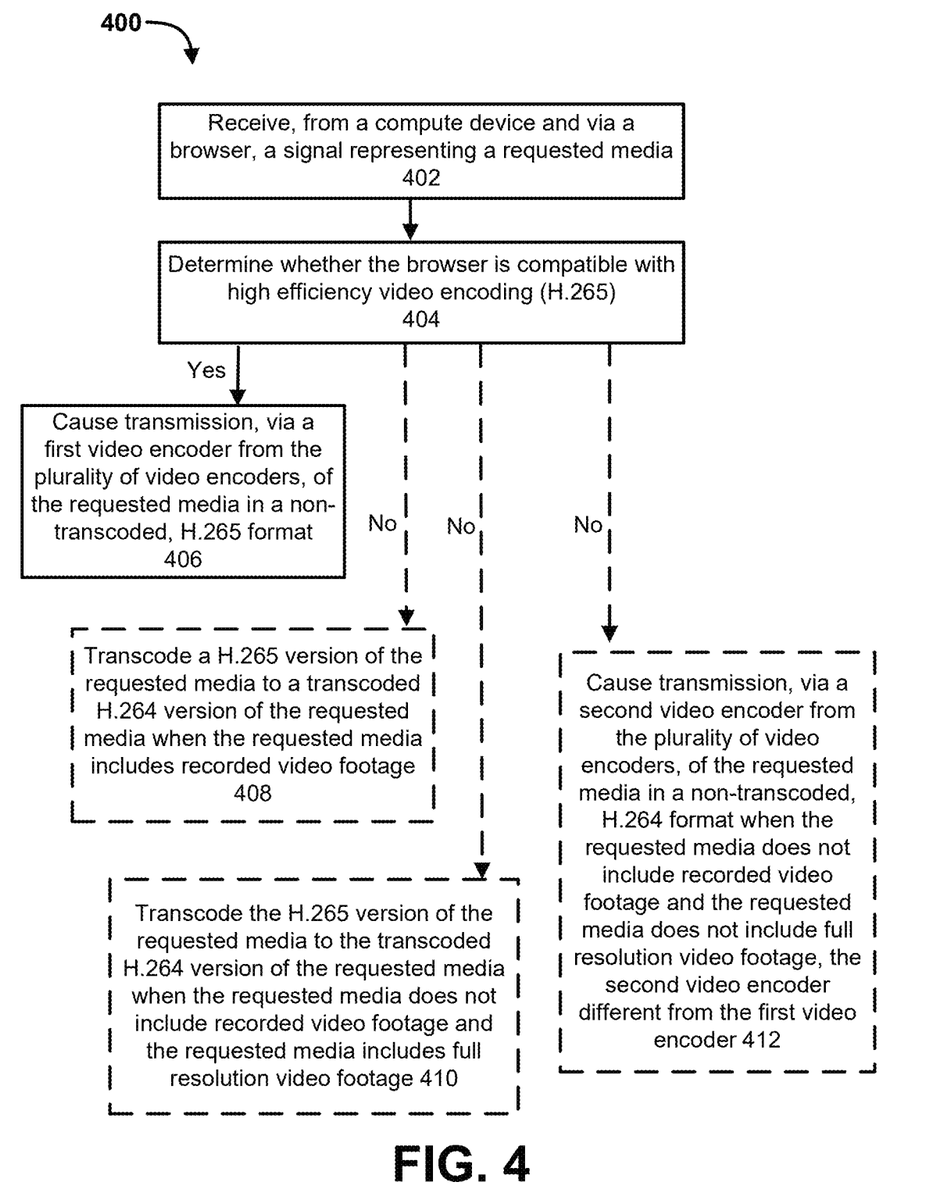
FIG. 4 is a flow diagram showing a third method for performing hybrid video encoding and implementing fallback logic, according to some embodiments.

FIG. 4 is a flow diagram showing a third method for performing hybrid video encoding and implementing fallback logic, according to some embodiments. The method 400 of FIG. 4 can be implemented, for example, using a system such as system 100 of FIG. 1. As shown in FIG. 4, the method 400 includes receiving, at 402, from a compute device and via a browser, a signal representing a requested media. The method 400 also includes determining, at 404, whether the browser is compatible with high efficiency video encoding (H.265). In response to the browser being determined to be compatible with high efficiency video encoding, the method 400 includes causing transmission, at 406 and via a first video encoder from the set of video encoders, of the requested media in a non-transcoded, H.265 format. In response to the browser being determined at 404 not to be compatible with high efficiency video encoding, the method 400 includes one of: (1) transcoding a H.265 version of the requested media to a transcoded H.264 version of the requested media when the requested media includes recorded video footage (at 408), (2) transcoding the H.265 version of the requested media to the transcoded H.264 version of the requested media when the requested media does not include recorded video footage and the requested media includes full resolution video footage (at 410), or (3) causing transmission, via a second video encoder from the set of video encoders, of the requested media in a non-transcoded, H.264 format when the requested media does not include recorded video footage and the requested media does not include full resolution video footage, the second video encoder different from the first video encoder (at 412).

In some implementations, the first encoder is configured for (1) high resolution encoding, (2) a group-of-pictures (GOP) size of about 4 seconds, (3) live streaming, and (4) recording-to-storage. Alternatively or in addition, the second encoder can be configured for (1) down-sampled resolution encoding, (2) a group-of-pictures (GOP) size of about 4 seconds, (3) live streaming, and (4) recording-to-storage, the second encoder different from the first encoder. Alternatively or in addition, a third encoder from the plurality of encoders can be configured for (1) down-sampled encoding, (2) a group-of-pictures (GOP) size of about 1 second, and (3) live streaming, the third encoder different from the first encoder and the second encoder, the third encode not configured for recording-to-storage.

In some implementations, the first encoder has an associated group-of-pictures (GOP) size of about 4 seconds, and is configured to perform both live streaming and recording-to-storage. Alternatively or in addition, the second encoder has an associated group-of-pictures (GOP) size of about 4 seconds, and is configured to perform both live streaming and recording-to-storage. Alternatively or in addition, a third encoder from the plurality of encoders has an associated group-of-pictures (GOP) size of about 1 second and is configured to perform live streaming but is not configured to record-to-storage.

In some implementations, the first encoder has an associated group-of-pictures (GOP) size of about 1 second, the second encoder has an associated group-of-pictures (GOP) size of about 4 seconds, and a third encoder from the plurality of encoders has an associated group-of-pictures (GOP) size of about 4 seconds.

In some implementations, the first encoder is configured to output H.264-encoded video, the second encoder is configured to output H.265-encoded video, and a third encoder from the plurality of encoders is configured to output H.265-encoded video.

In some implementations, at least one of the first encoder or the second encoder is configured to perform live streaming at 1.1× real-time relative to an instantaneous decoder refresh (IDR) frame.

Although shown and described herein, in accordance with some embodiments, as applying to the hybrid encoding/transcoding of (and delivery of) video data in/between H.264 and H.265 video encoding formats, to ensure playability on both compatible and incompatible compute devices, embodiments of the present disclosure can alternatively or additionally be used for encoding of, transcoding between, and delivery ("serving") of video in any of a variety of other video encoding formats/codecs, such as AOMedia Video 1 (AV1), VP9 (Google®), and/or versatile video coding (VVC) (also referred to as H.266).

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. An apparatus, comprising:
a processor; and
a memory operably coupled to the processor, the memory storing instructions to cause the processor to:
  receive, from a compute device including a viewer, a signal representing a request specifying a requested media;
  determine whether the viewer is configured to support high efficiency video encoding;
  in response to the viewer being determined to support high efficiency video encoding:
    cause transmission of the requested media in a non-transcoded format having a first video encoding;
  when the viewer is determined not to support high efficiency video encoding:
    determine whether the requested media includes recorded video footage;
    in response to the requested media being determined to include recorded video footage:
      transcode a version of the requested media having the first video encoding to a transcoded version of the requested media having a second video encoding different from the first video encoding, and
      cause transmission of the transcoded version of the requested media;
    when the requested media is determined not to include recorded video footage:

determine whether the requested media includes full resolution video footage;
in response to the requested media being determined to include full resolution video footage:
transcode the version of the requested media having the first video encoding to the transcoded version of the requested media having the second video encoding, and
cause transmission of the transcoded version of the requested media; and
in response to the requested media being determined not to include full resolution video footage:
cause transmission of the requested media in a non-transcoded format having the second video encoding.

2. The apparatus of claim 1, further comprising a plurality of encoders operably coupled to the processor, wherein:
the instructions to cause transmission of the requested media in the non-transcoded format having the first video encoding include instructions to cause transmission of the requested media via a first encoder from the plurality of encoders; and
the instructions to cause transmission of the requested media in the non-transcoded format having the second video encoding include instructions to cause transmission of the requested media via a second encoder from the plurality of encoders, the second encoder different from the first encoder.

3. The apparatus of claim 1, further comprising a plurality of encoders, operably coupled to the processor, that includes:
a first encoder configured for (1) high resolution encoding, (2) a group-of-pictures (GOP) size of about 4 seconds, (3) live streaming, and (4) recording-to-storage;
a second encoder configured for (1) down-sampled resolution encoding, (2) a group-of-pictures (GOP) size of about 4 seconds, (3) live streaming, and (4) recording-to-storage, the second encoder different from the first encoder; and
a third encoder configured for (1) down-sampled encoding, (2) a group-of-pictures (GOP) size of about 1 second, and (3) live streaming, the third encoder different from the first encoder and the second encoder, the third encoder not configured for recording-to-storage.

4. The apparatus of claim 3, wherein at least one of the first encoder or the second encoder is configured to perform live streaming at 1.1× real-time relative to an instantaneous decoder refresh (IDR) frame.

5. The apparatus of claim 1, further comprising a plurality of encoders, operably coupled to the processor, that includes:
a first encoder configured to output H.264-encoded video;
a second encoder configured to output H.265-encoded video; and
a third encoder configured to output H.265-encoded video.

6. The apparatus of claim 1, further comprising a plurality of encoders, operably coupled to the processor, that includes:
a first encoder from the plurality of encoders has an associated group-of-pictures (GOP) size of about 1 second;
a second encoder from the plurality of encoders has an associated group-of-pictures (GOP) size of about 4 seconds; and
a third encoder from the plurality of encoders has an associated group-of-pictures (GOP) size of about 4 seconds.

7. The apparatus of claim 1, further comprising a plurality of encoders, operably coupled to the processor, that includes:
a first encoder from the plurality of encoders has an associated group-of-pictures (GOP) size of about 4 seconds, and is configured to perform both live streaming and recording-to-storage;
a second encoder from the plurality of encoders has an associated group-of-pictures (GOP) size of about 4 seconds, and is configured to perform both live streaming and recording-to-storage; and
a third encoder from the plurality of encoders has an associated group-of-pictures (GOP) size of about 1 second and is configured to perform live streaming but is not configured to record-to-storage.

8. A non-transitory, processor-readable medium storing instructions to cause a processor to:
receive, from a compute device, a signal representing a request specifying a requested media;
determine whether a browser of the compute device is configured to support high efficiency video encoding;
in response to the browser being determined to support high efficiency video encoding:
cause transmission of the requested media in a non-transcoded, H.265 format;
in response to the browser being determined not to support high efficiency video encoding:
determine whether the requested media includes recorded video footage;
in response to the requested media being determined to include recorded video footage:
transcode a H.265 version of the requested media to a transcoded H.264 version of the requested media, and
cause transmission of the requested media in the transcoded H.264 format;
in response to the requested media being determined not to include recorded video footage:
determine whether the requested media includes full resolution video footage;
in response to the requested media being determined to include full resolution video footage:
transcode the H.265 version of the requested media to the transcoded H.264 version of the requested media, and
cause transmission of the requested media in the transcoded H.264 format; and
in response to the requested media being determined not to include full resolution video footage:
cause transmission of the requested media in a non-transcoded, H.264 format.

9. The non-transitory, processor-readable medium of claim 8, wherein:
the instructions to cause transmission of the requested media in the non-transcoded, H.265 format include instructions to cause transmission of the requested media via a first encoder from a plurality of encoders; and
the instructions to cause transmission of the requested media in the non-transcoded, H.264 format include instructions to cause transmission of the requested media via a second encoder from the plurality of encoders, the second encoder different from the first encoder.

10. The non-transitory, processor-readable medium of claim 9, wherein:
the first encoder is configured for (1) high resolution encoding, (2) a group-of-pictures (GOP) size of about 4 seconds, (3) live streaming, and (4) recording-to-storage; and
the second encoder is configured for (1) down-sampled resolution encoding, (2) a group-of-pictures (GOP) size of about 4 seconds, (3) live streaming, and (4) recording-to-storage, the second encoder different from the first encoder.

11. The non-transitory, processor-readable medium of claim 9, wherein:
the first encoder has an associated group-of-pictures (GOP) size of about 4 seconds, and is configured to perform both live streaming and recording-to-storage;
the second encoder has an associated group-of-pictures (GOP) size of about 4 seconds, and is configured to perform both live streaming and recording-to-storage; and
a third encoder from the plurality of encoders has an associated group-of-pictures (GOP) size of about 1 second and is configured to perform live streaming but is not configured to record-to-storage.

12. The non-transitory, processor-readable medium of claim 9, wherein:
the first encoder has an associated group-of-pictures (GOP) size of about 1 second;
the second encoder has an associated group-of-pictures (GOP) size of about 4 seconds; and
a third encoder from the plurality of encoders has an associated group-of-pictures (GOP) size of about 4 seconds.

13. The non-transitory, processor-readable medium of claim 9, wherein:
the first encoder is configured to output H.264-encoded video;
the second encoder is configured to output H.265-encoded video; and
a third encoder from the plurality of encoders is configured to output H.265-encoded video.

14. The non-transitory, processor-readable medium of claim 9, wherein at least one of the first encoder or the second encoder is configured to perform live streaming at 1.1× real-time relative to an instantaneous decoder refresh (IDR) frame.

15. A system, comprising:
a processor;
a plurality of video encoders operably coupled to the processor; and
a memory operably coupled to the processor, the memory storing instructions to cause the processor to:
receive, from a compute device and via a browser, a signal representing a requested media;
determine whether the browser is compatible with high efficiency video encoding (H.265);
in response to the browser being determined to be compatible with high efficiency video encoding:
cause transmission, via a first video encoder from the plurality of video encoders, of the requested media in a non-transcoded, H.265 format;
in response to the browser being determined not to be compatible with high efficiency video encoding, one of:

transcode a H.265 version of the requested media to a transcoded H.264 version of the requested media when the requested media includes recorded video footage,
transcode the H.265 version of the requested media to the transcoded H.264 version of the requested media when the requested media does not include recorded video footage and the requested media includes full resolution video footage, or
cause transmission, via a second video encoder from the plurality of video encoders, of the requested media in a non-transcoded, H.264 format when the requested media does not include recorded video footage and the requested media does not include full resolution video footage, the second video encoder different from the first video encoder.

16. The system of claim 15, wherein:
the first video encoder is configured for (1) high resolution encoding, (2) a group-of-pictures (GOP) size of about 4 seconds, (3) live streaming, and (4) recording-to-storage;
the second video encoder is configured for (1) down-sampled resolution encoding, (2) a group-of-pictures (GOP) size of about 4 seconds, (3) live streaming, and (4) recording-to-storage, the second video encoder different from the first video encoder; and
a third video encoder from the plurality of video encoders is configured for (1) down-sampled encoding, (2) a group-of-pictures (GOP) size of about 1 second, and (3) live streaming, the third video encoder different from the first video encoder and the second video encoder, the third video encoder not configured for recording-to-storage.

17. The system of claim 15, wherein:
the first video encoder has an associated group-of-pictures (GOP) size of about 4 seconds, and is configured to perform both live streaming and recording-to-storage;
the second video encoder has an associated group-of-pictures (GOP) size of about 4 seconds, and is configured to perform both live streaming and recording-to-storage; and
a third video encoder from the plurality of video encoders has an associated group-of-pictures (GOP) size of about 1 second and is configured to perform live streaming but is not configured to record-to-storage.

18. The system of claim 15, wherein:
the first video encoder has an associated group-of-pictures (GOP) size of about 1 second;
the second video encoder has an associated group-of-pictures (GOP) size of about 4 seconds; and
a third video encoder from the plurality of video encoders has an associated group-of-pictures (GOP) size of about 4 seconds.

19. The system of claim 15, wherein:
the first video encoder is configured to output H.264-encoded video;
the second video encoder is configured to output H.265-encoded video; and
a third video encoder from the plurality of video encoders is configured to output H.265-encoded video.

20. The system of claim 15, wherein at least one of the first video encoder or the second video encoder is configured to perform live streaming at 1.1× real-time relative to an instantaneous decoder refresh (IDR) frame.

* * * * *

UNITED STATES PATENT AND TRADEMARK OFFICE
CERTIFICATE OF CORRECTION

Page 1 of 1

PATENT NO. : 12,439,103 B1
APPLICATION NO. : 18/678258
DATED : October 7, 2025
INVENTOR(S) : Pushpak Pujari et al.

It is certified that error appears in the above-identified patent and that said Letters Patent is hereby corrected as shown below:

On the Title Page

Item (72) Inventors: delete "Chris Hiszpanski, Santa Clara, CA" and insert -- Chris Hiszpanski, Santa Clarita, CA --

In the Specification

Column 2, Line 1: delete "In some embodiments, anon-transitory, processor-read-" and insert -- In some embodiments, a non-transitory, processor-read- --

Column 11, Line 63: delete "In some embodiments, anon-transitory, processor-read-" and insert -- In some embodiments, a non-transitory, processor-read- --

Signed and Sealed this
Twenty-fifth Day of November, 2025

John A. Squires
*Director of the United States Patent and Trademark Office*